118,954

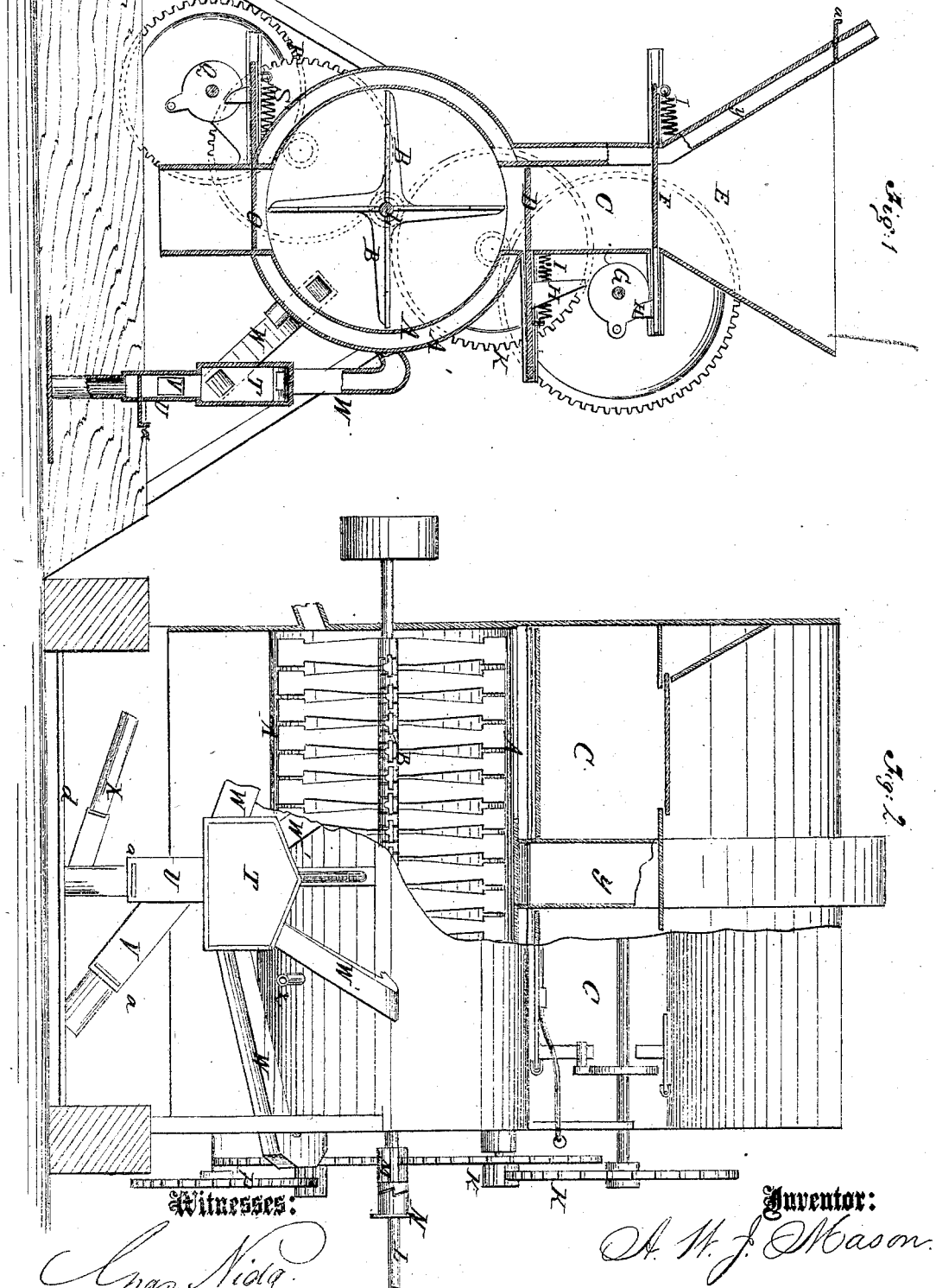

UNITED STATES PATENT OFFICE.

ALFRED W. J. MASON, OF NEW ORLEANS, LOUISIANA.

IMPROVEMENT IN GRAIN-DRIERS.

Specification forming part of Letters Patent No. 118,954, dated September 12, 1871.

*To all whom it may concern:*

Be it known that I, ALFRED W. J. MASON, of New Orleans, in the parish of Orleans and State of Louisiana, have invented a new and Improved Grain-Drier; and I do hereby declare that the following is a full, clear, and exact description thereof, which will enable others skilled in the art to make and use the same, reference being had to the accompanying drawing forming part of this specification.

This invention relates to improvements in grain-driers; and it consists in a combination of hot and cold-air induction and exhaust-pipes with a drying-cylinder beater in a novel manner, as hereinafter described, for subjecting the grain to treatment by either hot or cold air while being agitated.

Figure 1 is a transverse sectional elevation of a grain-drier provided with the improvements, and Fig. 2 is partly a longitudinal sectional elevation and partly a side elevation.

Similar letters of reference indicate corresponding parts.

A is a horizontal stationary cylinder, having rotary beaters B, into which the grain is admitted from a charger, C, when a valve, D, is opened; said grain being supplied to the charger from a hopper, E, when the valve F is opened. The valves are opened alternately by the cam-wheel G acting on the tappets H, and they are closed by a spring, I. The cam-wheel is worked by gearing K, connecting its shaft with the shaft L of the beaters B, being driven by a pinion, M, thereon, which will not turn when released from the clutch N, which is connected with it when it is desired to actuate said valves. The gear-wheels are arranged to turn the cam-wheel G very slowly to allow a sufficient interval of time to elapse for the grain in the cylinder to be acted on by the heat as much as required before admitting another batch, previous to which that in the cylinder is allowed to escape through a valve, O, at the bottom of the cylinder, actuated in the same manner that the valves D F are by gearing P, a cam-wheel, Q, and a spring, S. The gearings for working the valves are applied so as to be readily detached for applying others of different sizes for different speeds, to open the valves sooner or later, according to the condition or kind of grain to be treated.

The apparatus thus far described is similar to that described in the patent granted to me in 1860. The present invention consists in the air-distributing chamber T, hot-air pipe U, cold-air pipe V, for admitting either cold or hot-air into the said chamber T. The distributing-pipes W and W', leading from said chamber into the cylinder for admitting the air thereto, to act upon the grain either to heat or cool it, and the exhaust-pipe Y, leading from the cylinder to conduct the evaporations from the grain away. The pipes U, V, and W are provided with valves $a$ to regulate the flow of the air, and the pipe U has a discharge-pipe, X, below its valve for turning off the hot air when required, said pipe X also having a valve, $d$. The air, whether heated or cold, is to be impelled by any suitable means. The cylinder A will sometimes have a jacket, A', between which and said cylinder, air, either cold or heated, may be used for regulating the temperature, as required, being supplied through a pipe, Z.

The apparatus provided with this system of pipes, or any equivalent of it, is rendered very efficient for drying and cooling grain passing through it in batches, so as to be retained a longer or shorter time as required, by the nature of the case in hand, for drying more or less.

In the application of steam for expanding and contracting rice, in combination with the friction of the arms, it will be necessary to attach a steam-pipe at each end of the cylinder.

Having thus described my invention, I claim as new and desire to secure by Letters Patent—

The combination, with the cylinder-beaters and the apparatus for admitting and discharging the grain, of the hot and cold-air pipes U V, air-distributer T, distributing-pipes W W', and the exhaust-pipe Y, all substantially as specified.

ALFRED W. J. MASON.

Witnesses:
 GEO. S. KNOWER,
 WILLIAM BEATTIE.